United States Patent
Zhang et al.

(10) Patent No.: US 11,609,336 B1
(45) Date of Patent: Mar. 21, 2023

(54) REFRACTION COMPENSATION FOR USE IN LIDAR SYSTEMS

(71) Applicant: INNOVUSION IRELAND LIMITED, Los Altos, CA (US)

(72) Inventors: Rui Zhang, Palo Alto, CA (US); Yimin Li, Cupertino, CA (US); Junwei Bao, Los Altos, CA (US); Jim Li, Fremont, CA (US)

(73) Assignee: Innovusion, Inc., Sunnyvale, CA (US)

( * ) Notice: Subject to any disclaimer, the term of this patent is extended or adjusted under 35 U.S.C. 154(b) by 866 days.

(21) Appl. No.: 16/545,195

(22) Filed: Aug. 20, 2019

Related U.S. Application Data

(60) Provisional application No. 62/720,307, filed on Aug. 21, 2018.

(51) Int. Cl.
*H01S 3/10* (2006.01)
*G01S 17/931* (2020.01)
*G01S 7/481* (2006.01)
*G02B 1/11* (2015.01)
*H01S 3/067* (2006.01)

(52) U.S. Cl.
CPC .......... *G01S 17/931* (2020.01); *G01S 7/4813* (2013.01); *H01S 3/10061* (2013.01); *G02B 1/11* (2013.01); *H01S 3/067* (2013.01)

(58) Field of Classification Search
CPC .. G01S 17/931; G01S 7/4813; H01S 3/10061; H01S 3/067; G02B 1/01
See application file for complete search history.

(56) References Cited

U.S. PATENT DOCUMENTS

| | | | |
|---|---|---|---|
| 3,897,150 A | 7/1975 | Bridges et al. | |
| 4,464,048 A | 8/1984 | Farlow | |
| 5,006,721 A | 4/1991 | Cameron | |
| 5,157,451 A | 10/1992 | Taboada et al. | |
| 5,234,748 A * | 8/1993 | Demiryont | B32B 17/10036 428/428 |
| 5,319,434 A | 6/1994 | Croteau et al. | |
| 5,327,280 A * | 7/1994 | Morimoto | G02B 26/125 359/205.1 |
| 5,369,661 A | 11/1994 | Yamaguchi et al. | |

(Continued)

FOREIGN PATENT DOCUMENTS

| | | |
|---|---|---|
| CN | 204758260 U | 11/2015 |
| CN | 204885804 U | 12/2015 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages,.

(Continued)

*Primary Examiner* — David P Porta
*Assistant Examiner* — Mamadou Faye
(74) *Attorney, Agent, or Firm* — Mauriel Kapouytian Woods LLP; Liang Huang

(57) ABSTRACT

Embodiments discussed herein refer to LiDAR systems that use refraction compensation to improve transmission efficiency of light energy through transmissive mediums such as covers. Refraction compensation can be achieved using a cover or an anti-reflective coating.

21 Claims, 6 Drawing Sheets

(56) References Cited

U.S. PATENT DOCUMENTS

| | | |
|---|---|---|
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,068,914 A * | 5/2000 | Boire ............... B32B 17/10761 428/428 |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di et al. |
| 7,489,865 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 2002/0136251 A1 | 9/2002 | Green et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0254019 A1* | 10/2010 | Cui ..................... G01S 13/723 250/461.1 |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0182302 A1* | 7/2013 | Shikii .................. H04N 9/3161 359/13 |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |

(56) References Cited

U.S. PATENT DOCUMENTS

| | | |
|---|---|---|
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Watnik et al. |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2017/0371347 A1* | 12/2017 | Cohen .................. B60W 30/08 |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284244 A1* | 10/2018 | Russell ................ G01S 7/4868 |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0018108 A1* | 1/2019 | Gao ...................... G01S 7/4814 |
| 2019/0025428 A1 | 1/2019 | Li et al. |
| 2019/0101627 A1* | 4/2019 | Hansson ................ G01S 17/04 |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0299752 A1* | 10/2019 | Sadakane .......... B32B 17/10348 |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |
| 2021/0271077 A1* | 9/2021 | Huber .................... G02B 30/29 |

FOREIGN PATENT DOCUMENTS

| | | |
|---|---|---|
| CN | 207457508 U | 6/2018 |
| CN | 207557465 U | 6/2018 |
| CN | 1087132472 A | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

Goldstein, R. (Apr. 1986) "Electro-Optic Devices in Review, The Linear Electro-Optic (Pockels) Effect Forms the Basis for a Family

(56) References Cited

OTHER PUBLICATIONS of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for international Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for international Application No. PCT/US2019/019264, 15 pages.
International Search Report and Written Opinion, dated Jan. 3, 2019, for international Application No. PCT/US2018/056577, 15 pages.
International Search Report and Written Opinion, dated Mar. 23, 2018, for international Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], spie, us, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-waveiengths-matter-in-fiber-optics/, (2021), 5 pages.

\* cited by examiner

REFRACTION COMPENSATION FOR USE IN LIDAR SYSTEMS

CROSS-REFERENCE TO A RELATED APPLICATION

This application claims the benefit of U.S. Provisional Application No. 62/720,307, filed Aug. 21, 2018, the disclosure of which is incorporated herein in its entirety.

FIELD OF THE INVENTION

The present disclosure relates to light detection and ranging (LiDAR), and in particular to refraction compensation for LiDAR systems.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. LiDAR systems, for example, can provide the sensory input required by a semi-autonomous or fully autonomous vehicle.

BRIEF SUMMARY

Embodiments discussed herein refer to refraction compensation for LiDAR systems.

In one embodiment, a LiDAR system is provided that can include a laser operative to emit light characterized as having a p-polarization and s-polarization; and a light transmissive cover characterized as having a reflective polarization plane, wherein the laser is aligned with the light transmissive cover such that the p-polarization of the laser is co-planer with the reflective polarization plane of the light transmissive cover.

In one embodiment, a curved cover for use with LiDAR system can be provided that can include a medium comprising a first curve and a second curve, wherein the first and second curves are designed to minimize deformation of exiting and receiving light beams and to prevent formation of ghost images, and wherein a focal length of the first and second curves is infinity.

In one embodiment, a LiDAR system mounted to a windshield of a vehicle is provided that can include a laser system operative to emit light according to a beam field of view towards the windshield; and a windshield cover mounted to the windshield, wherein the windshield cover is operative to adjust the beam field of view to yield an exit beam field of view that compensates for Fresnel properties of the windshield.

In one embodiment, a vehicle system is provided that can include a windshield comprising an anti-reflective (AR) coating that covers a beam transmission portion of the windshield; and a laser system operative to emit light according to a beam field of view towards the beam transmission portion of the windshield, wherein the AR coating is operative to adjust the beam field of view to yield an exit beam field of view that compensates for Fresnel properties of the windshield.

A further understanding of the nature and advantages of the embodiments discussed herein may be realized by reference to the remaining portions of the specification and the drawings.

DETAILED DESCRIPTION

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
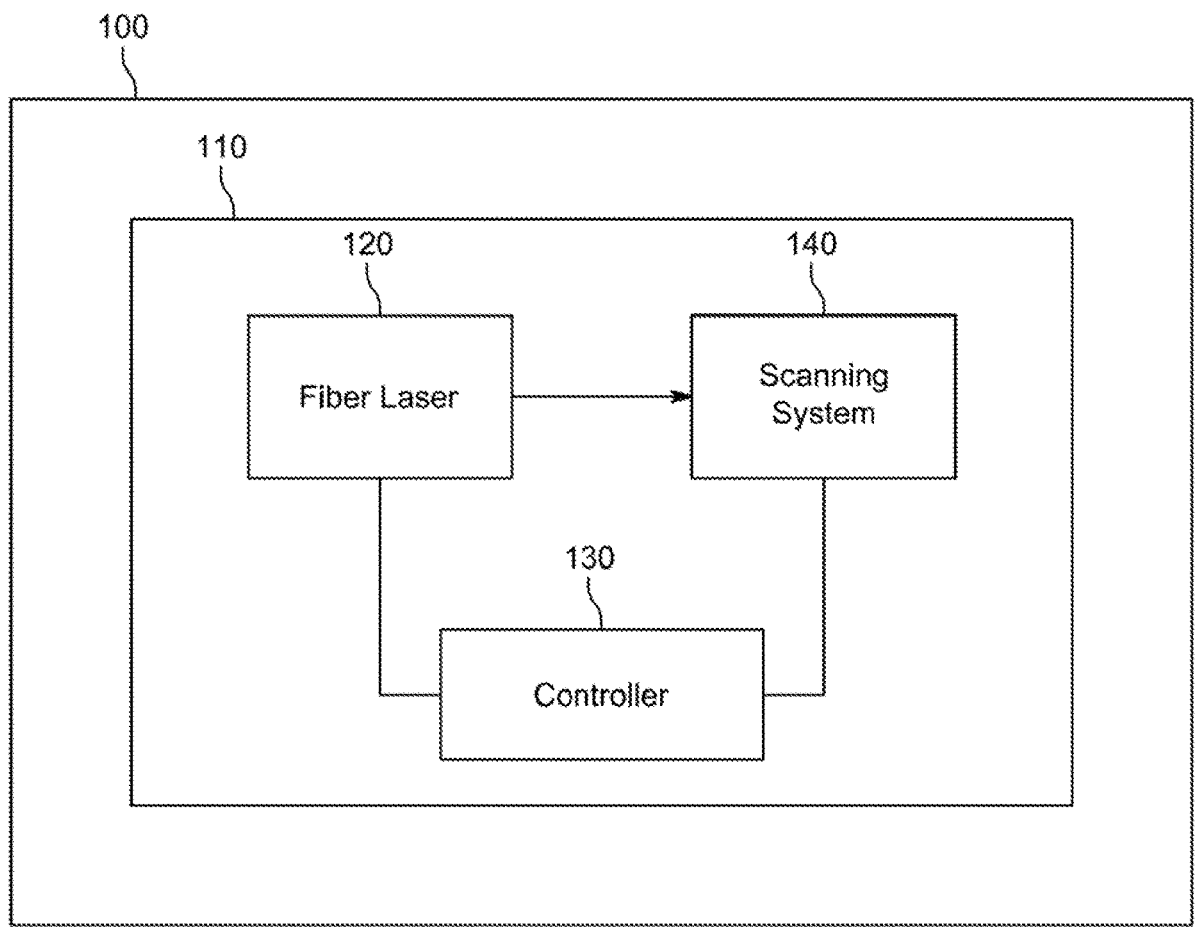
FIG. 1 shows an illustrative vehicle having a LiDAR system that is attached to and/or incorporated therein, according to an embodiment.

FIG. 1 shows an illustrative vehicle 100 having a LiDAR system 110 that is attached to and/or incorporated therein according to an embodiment. Vehicle 100 can be an automobile, a truck, a drone, a plane, a robot, a hand-held device, a stationary device, or any other suitable platform on which LiDAR system 110 can be used. LiDAR system 110 can be fully contained within an interior portion of vehicle 100, mounted to an exterior portion of vehicle 100, or contained partially within the interior portion and partially mounted to the exterior. Interior portions may be portions of vehicle 100 that are not directly exposed to external environmental factors such as the environment conditions (e.g., water, humidity, sun, ice, wind, etc.) and road conditions (e.g., road debris). The interior portion may be influenced by external environment conditions but to a lesser degree than the exterior portion.

LiDAR system 110 may include, among other features, fiber laser 120, controller 130, and scanning system 140. Fiber laser 120 may be any suitable laser that uses a seed laser and at least one amplifier and also includes an active gain medium that is rare-earth ion doped. In some embodiments, two or more fiber lasers may be used in LiDAR system 110. In yet another embodiment, the fiber laser may be replaced with one or more diode lasers. Controller 130 may be operative to control LiDAR system 110. For example, controller 130 may control operating parameters of fiber laser 120. Scanning system 140 may include the appropriate lenses, mirrors, steering optics, and detectors needed to capture an image of a scene existing within a vicinity of vehicle 100. Fiber laser 120 serves as the source of light pulses that are provided to scanning system 140. Scanning system 140 can control projection of those light pulses in accordance with a field of view of scanning system 140. The field of view includes lateral and vertical fields of view in which laser pulses are transmitted to capture an X×Y image every scan cycle. This X×Y image is obtained each scan cycle and any objects detected with the image are detected by returns of the laser pulses. The images are processed by software to determine the location and distance of the objects.

When light passes from one medium (having a first refractive index) to another medium (having a second refractive index), both reflection and refraction of the light may occur. The Fresnel equations describe what fraction of the light is reflected and what fraction is refracted (i.e., transmitted). In LiDAR applications, it is desirable to maximize refraction and minimize reflection. Reflection can cause ghosts, which are undesirable. Normal glass, for example, has a reflection of about 4%. When anti-reflective coatings are applied to the glass, the reflection can be, for example, 1-2% for a few degrees of incidence angles. The angle of incidence is the angle between a ray incident on a surface and the line perpendicular to the surface at the point of incidence, called the normal. The scanning system of a LiDAR system can produce incident angles that exceed 60, 70, 80, 90, 100, 110, 120 degrees or more, thus rendering anti-reflective coatings useless for all but a few degrees of all incident angles produced by the system.

The plane of incidence is the plane which contains the surface normal and the propagation vector of the incoming light. The orientation of the incident light's polarization with respect to the plane of incidence has an important effect on the strength of the reflection. The plane of incidence is the plane made by the incoming propagation direction and the vector perpendicular to the plane of an interface. The component of the electric field parallel to this plane is termed p-like (parallel) and the component perpendicular to this plane is termed s-like. Polarized light with its electric field along the plane of incidence is thus denoted p-polarized, while light whose electric field is normal to the plane of incidence is called s-polarized.

Figure 2:
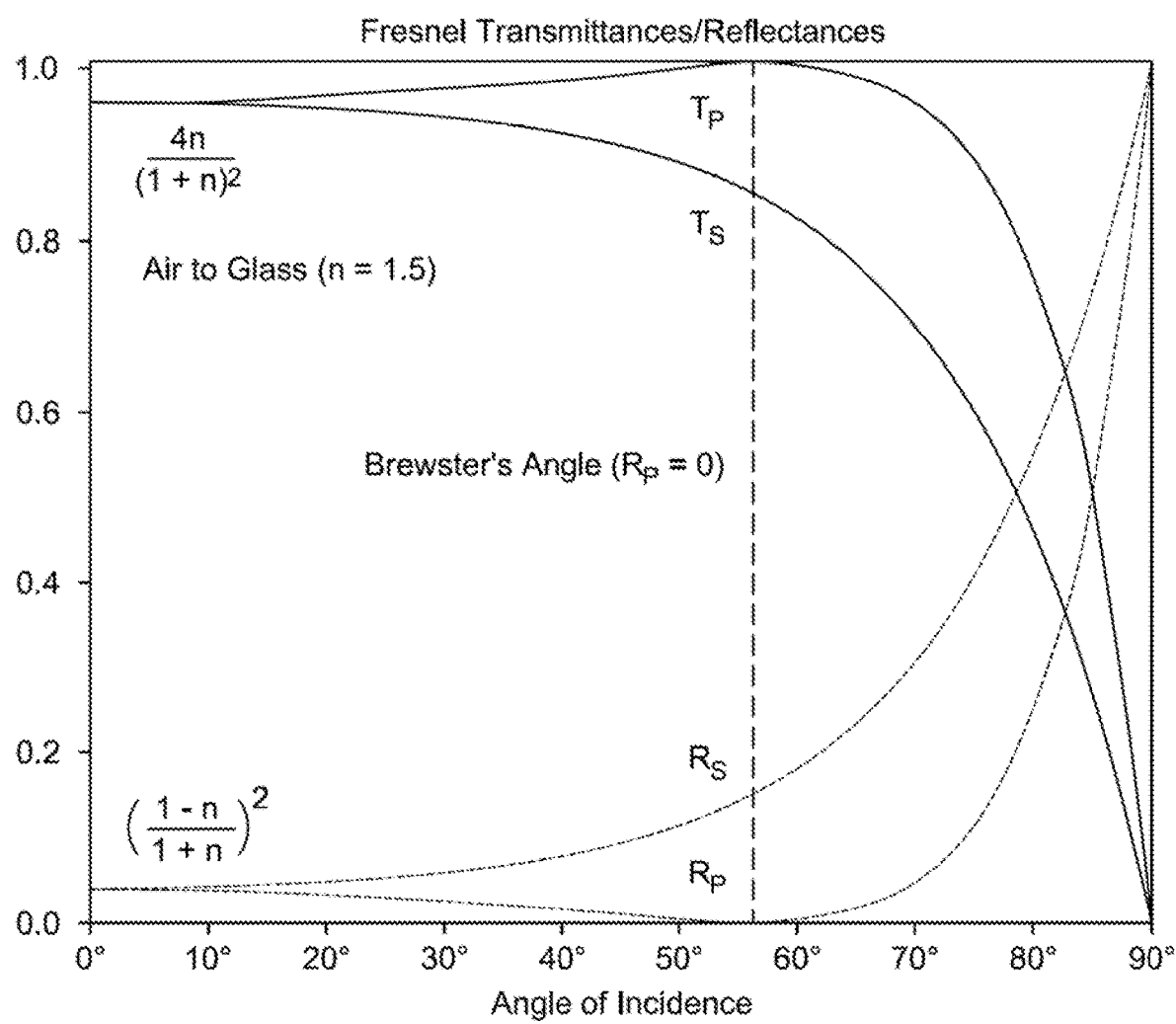
FIG. 2 shows an illustrative diagram of Fresnel transmittance and reflectance of an air to glass medium transition.

FIG. 2 shows an illustrative diagram of Fresnel transmittance and reflectance of an air to glass medium transition. FIG. 2 shows that so long as the Rp (p-polarized light) is minimized, the transmittance (Tp) of the light is maximized. As shown, the transmittance is maintained relatively high from 0-60 degrees of incidence angles.

Figure 3:
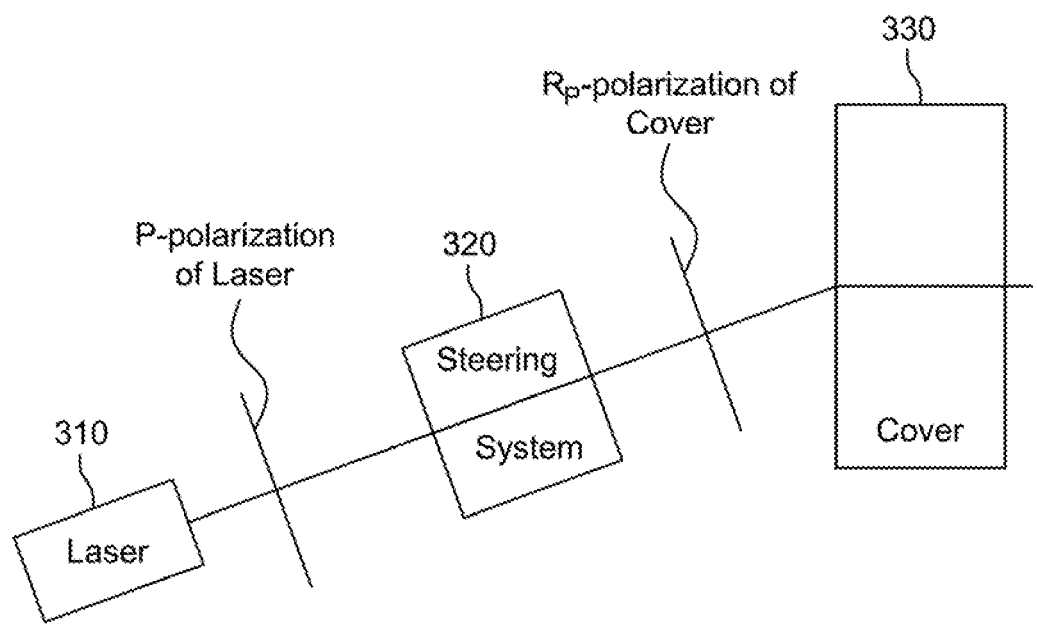
FIG. 3 shows an illustrative block diagram of a laser and cover according to an embodiment.

FIG. 3 shows an illustrative block diagram of a laser and cover according to an embodiment. Laser 310 may represent the output portion of a fiber laser or a diode laser system. The light being emitted by laser 310 may be polarized and has both p-polarization and s-polarization. Steering system 320 may represent the steering system responsible for controlling the projection of the laser through cover 330 to the ambient outside world. Cover 330 represents a cover that at least partially encloses a Lidar system. Cover 330 may be constructed from one or more light transmissive materials (e.g., plastic, glass, and/or anti-reflective coatings). Cover 330 may have reflective properties that affect p-polarization (Rp) and s-polarization (Rs) of incident light interfacing with it.

In order to maximize transmission power of incident light through cover 330, the light being emitted by laser 310 is oriented such that its p-polarization is co-planer with the Rp of cover 330. That is, during installation of laser 310 and cover 330 within a LiDAR system, both laser 310 and cover 330 are aligned such that the p-polarization of the laser is co-planer with the Rp of cover 330. When the p-polarization of the laser and Rp of cover are aligned, the transmission power can be maximized throughout a range of incidence angles so long as light being emitted by laser 310 remains co-planer with Rp of cover 330.

Figure 4:
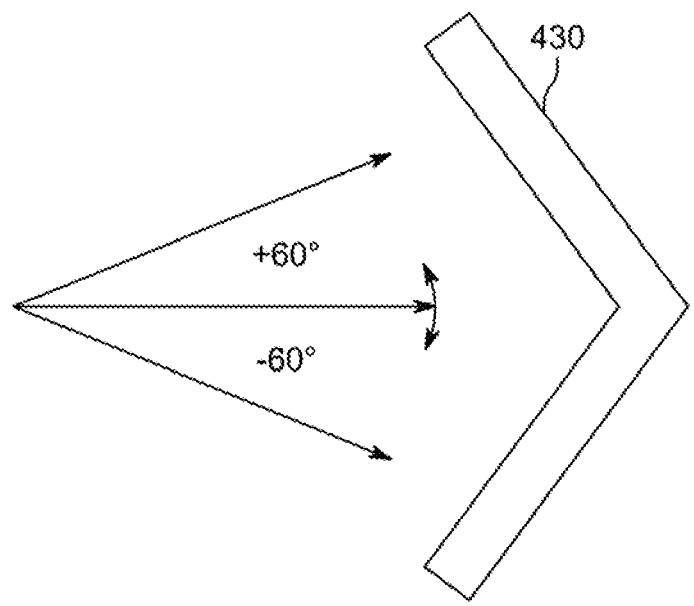
FIG. 4 shows that a p-polarized aligned light source can cycle through +60 degrees to −60 degrees and remain in-plane with a cover, according to an embodiment.

FIG. 4 shows that a p-polarized aligned light source can cycle through +60 degrees to -60 degrees and remain in-plane with the Rp of cover 430. This illustrates that 120 degrees of incidence angles can be projected on cover 430 and still maintain a substantially high transmittance power (as shown in FIG. 2).

Figure 5:
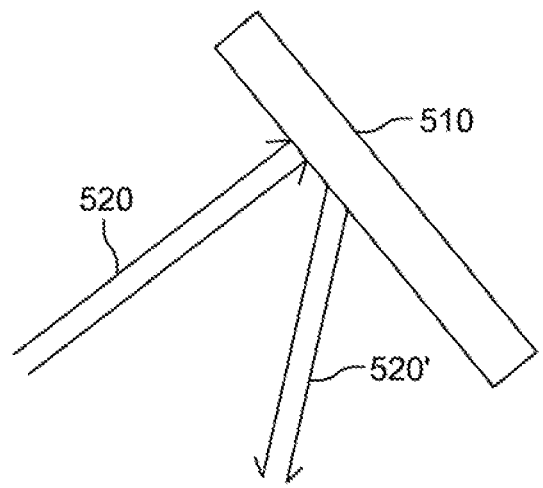
FIG. 5 shows a dual flat surface cover according to an embodiment.

FIG. 5 shows a cover having a flat surface on both sides of medium 510. Collimated beam 520 interfaces with medium 510 and reflects a collimated beam 520'. The flat surfaces of both sides of medium 510 ensures that the reflected beam remains collimated, but the reflection introduces a relatively strong ghost. Ghosts are undesirable because they can create false positives.

Figure 6:
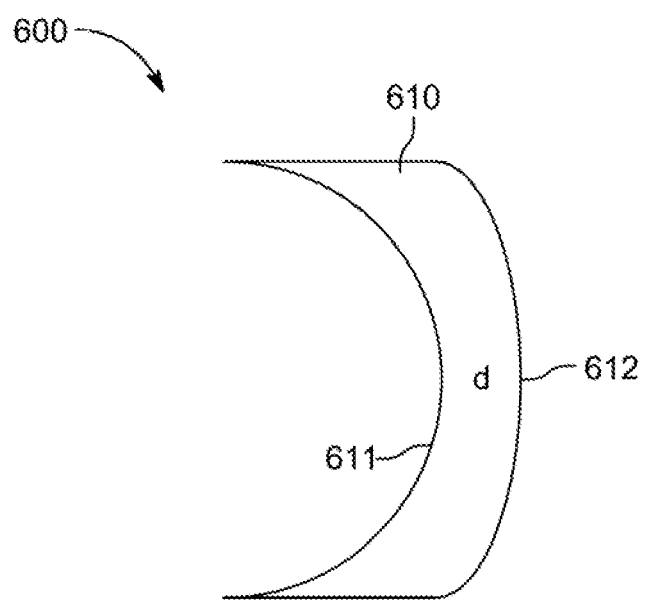
FIG. 6 shows a curved cover according to an embodiment.

FIG. 6 shows a curved cover 600 according to an embodiment. Curved cover 600 can include medium 610 that has first curve 611 and second curve 612. Using curved cover 600 can reduce high Fresnel reflection because the incident angle is small. Another benefit is that reflection at the surfaces is not collimated and can reduce the formation of ghost images. However, the curved cover has the potential to deform the exiting beam and receiving beam. First and second curves 611 and 612 are designed and shaped to minimize deformation of the exiting beam and receiving beam. For example, curves 611 and 612 can be designed to the following equation:

$$R1*n*(n-1)-(n-1)*n*R2+d*(n-1)^2=0,$$

where R1 is the radius of curve 611. R2 is the radius of curve 612, n is the refractive index of medium 610, and d is the thickness of medium 610. The focal length of curved cover 600 can be designed to be infinity. If desired, an anti-reflective material can be applied to one or both curves B11 and B12. Because the incidence angle is relatively small, the anti-reflective material would be effective throughout the Lidar scanning sweep. In addition, there is no need to account for the p-polarization of laser beam with curved cover 600.

Figure 7:
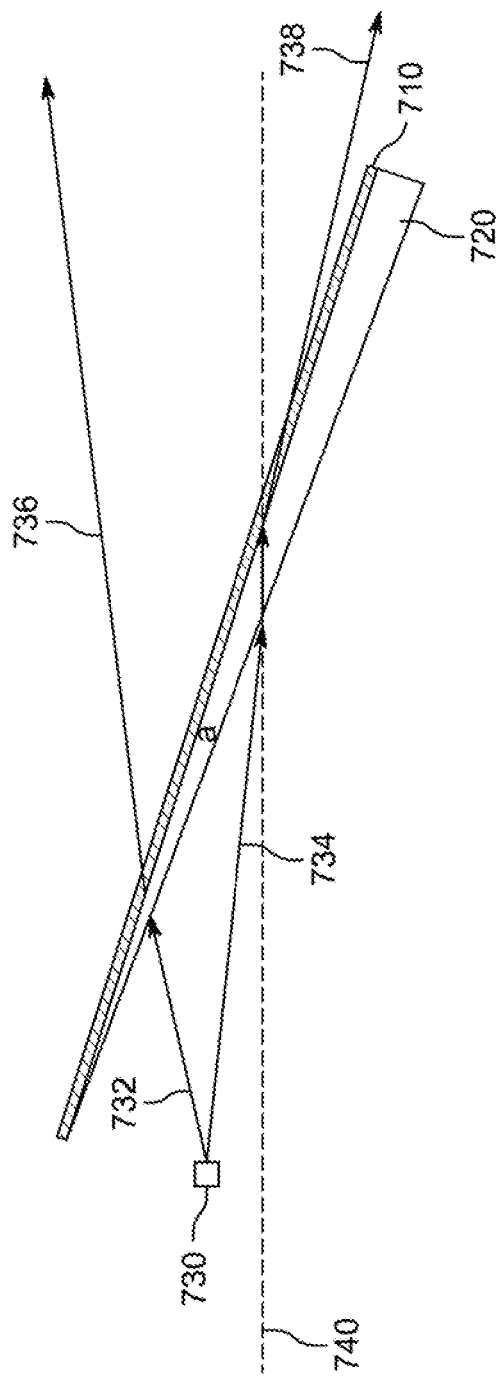
FIG. 7 shows a windshield cover designed to be used on combination with windshield, according to an embodiment.

FIG. 7 shows a windshield cover designed to be used in combination with windshield, according to an embodiment. Windshield 710 and cover 720 are shown. Windshield 710 is representative of one many different windshields that may exist on a vehicle. As such, the characteristics of the windshield may vary from vehicle to vehicle such as the angle of the windshield (from hood to roof) and any curvature(s) that may exist within the windshield. Windshield 710 is illustrated to be a substantially flat structure that exists at a fixed angle. Cover 720 can be coupled directly to windshield 710. It may be desirable for the interface between windshield 710 and cover 720 to be flush so that there are no variations in the interface, thereby providing a consistent interface to interface transition.

Laser steering system 730 may direct light signals through cover 720 and windshield 710. Steering system 730 may control both the vertical and horizontal field of view of the light signals being projected through windshield 710. The vertical field of view may range from a beam steered maximum angle 732 to a beam steered minimum angle 734. Cover 720 is designed so that it selectively adjusts exiting angles of the light originating from steering system 730. As shown, cover 720 has a triangular cross-section that increases in thickness as it spans from top of windshield 710 to bottom of windshield 710. This variation in thickness influences light transmission such that exit angles out of windshield 710 are changed relative to their respective originating beam steering angle. Maximum exit beam 736 and minimum exit beam 738 are shown. In some embodiments, cover 720 can be a prism.

For example, if windshield 710 has an angle of 22 degrees relative to horizontal axis 740 and that cover 720 has a 3 degree angle and a refractive index of 1.5. The incident angle of beam ranges from –4 degrees (for 734) to about 17 degrees (for 732), and the exiting beam ranges from minimum exit angle 738 of about –15 degrees to maximum exit angle 736 of about 14 degrees. The existence of prism 720 increases the range of the vertical field of view by a factor of about 1.4.

It should be appreciated that cover 720 can take any suitable shape to achieve desired exit angles. For example, cover 720 may be custom made for each windshield of each make and type of vehicle to compensate for idiosyncrasies of each windshield to yield desired vertical fields of view. This way, the same Lidar system can be used with any vehicle without a need for modifications to adapt to the windshield. Instead, cover 720 is customized for each windshield to allow an unmodified Lidar system to be used.

Figure 8A:
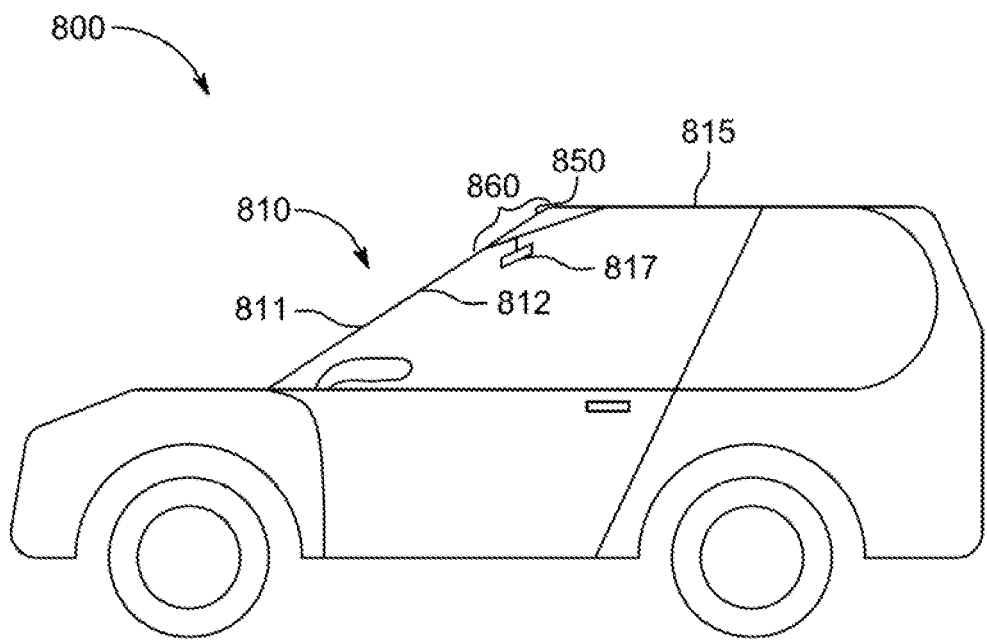
FIGS. 8A and 8B illustrate side and front views of vehicle having a windshield mounted LiDAR system, according to an embodiment.
Figure 8B:
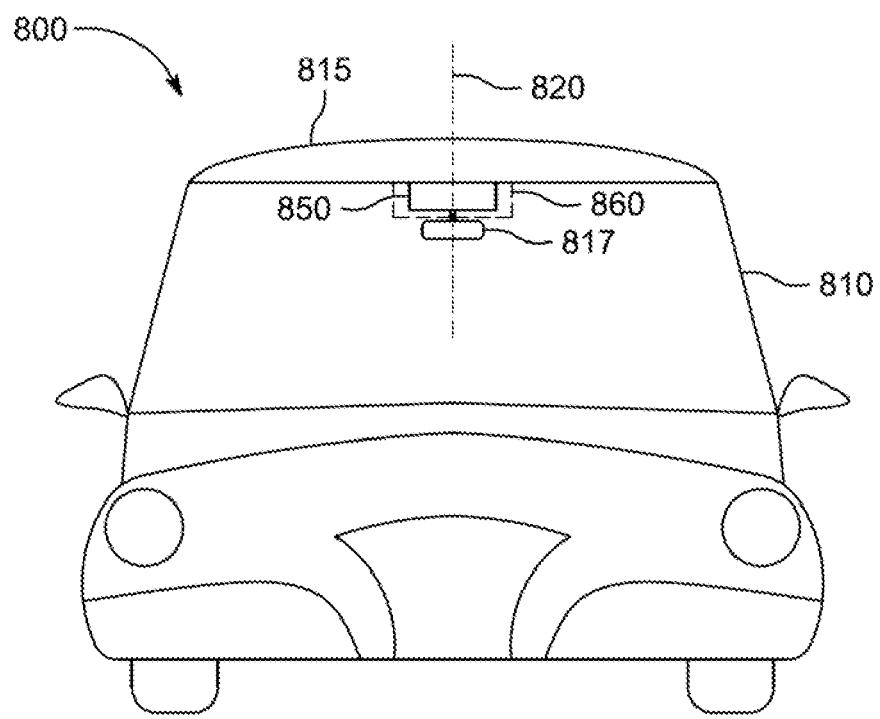

FIGS. 8A and 8B illustrate side and front views of vehicle 800 having a windshield mounted LiDAR system (WMLS) 850, according to an embodiment. Vehicle 800 is a generic representation of any vehicle that can transport persons or cargo from one location to another. Vehicle 800 has windshield 810, which has an exterior surface 811 that is exposed to the elements and an interior surface 812 that interfaces with the interior cabin of the vehicle. WMLS 850 can be mounted to the interior surface 812 of windshield 810. A thin layer of flexible material having refractive index similar to the windshield can be attached to both sides of the windshield with no air gap. The surface of the film exposed to air is AR (anti-reflective) coated so that when the windshield is sandwiched between two flexible films, the optical transmission loss through the film-windshield stack is minimized. The AR-coated thin material 860 may cover a portion of windshield 810. As illustrated, AR coating 860 may cover a portion of windshield 810 that is larger, the same, or smaller than a cross-sectional area of WMLS 850 that interfaces with windshield 810. AR-coated film 860 may be applied to exterior surface 811, interior surface 812, or both. As illustrated in FIGS. 8A and 8B, WMLS 850 is center mounted on windshield 810 along center axis 820 and near roof 815, such that it is positioned near the location of rear-view mirror 817. It should be understood that the position of WMLS 850 is merely illustrative and that WMLS 850 can be positioned anywhere on windshield 810. If desired, more than one WMLS 850 can be mounted to windshield 810. In addition, one or more LiDAR systems according to embodiments discussed herein can be mounted anywhere on vehicle 800.

In some embodiments, AR-coated film 860 can serve the same function as cover 330 of FIG. 3 or cover 720 of FIG. 7 without requiring a cover. For example, WMLS 850 may exist without a cover and is flush mounted directly to interior surface 812. This way, no cover is present to potentially interfere with the laser beams and AR coating 860 is provided to adjust p-polarization (Rp) and s-polarization (Rs) of incident light interfacing with windshield 810. AR coating 860 may have a variable thickness, similar to that described above in connection with cover 720. In other embodiments, multiple AR coatings may be used. For example, assume the AR coating occupies a fixed area. A first portion of the area (e.g., top half) may have an AR coating with first characteristics, and a second portion of the area (e.g., bottom half) may have an AR coating with second characteristics. In one example, the AR coating comprises an area the size of the beam transmission portion. A first portion of the area comprises a first refraction characteristic, and a second portion of the area comprises a second refraction characteristic. The first and second refraction characteristics are different.

AR-coated film 860 may be constructed from a thin and flexible material that is bonded to windshield 810. A first side of AR-coated film 860 may have a refractive index that is substantially similar to a refractive index of the windshield. In addition, an adhesive binding the coating to the windshield may also have a refractive index that substantially matches the refractive index of the first side and the windshield. A second side of AR-coating film 860 can adjust p-polarization (Rp) and s-polarization (Rs) of incident light interfacing with the windshield. In some embodiments, the second side's anti-reflective coating is selected based on the wavelength of the light source.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-8, as well as any other aspects of the invention, may each be implemented by software, but may also be implemented in hardware, finnware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A light detection and ranging (LiDAR) system, comprising:
    a laser configured to emit light characterized as having a p-polarization and s-polarization; and
    a light transmissive cover characterized as having a reflective polarization plane, wherein the laser is aligned with the light transmissive cover such that the p-polarization of the light is co-planer with the reflective polarization plane of the light transmissive cover to maximize transmission power.

2. The LiDAR system of claim 1, further comprising an anti-reflective coating applied to the light transmissive cover.

3. The LiDAR system of claim 1, further comprising:
    a scanning system configured to control a field of view of the light transmitted through the light transmissive cover.

4. The LiDAR system of claim 3, wherein the field of view comprises a vertical field of view and a horizontal field of view, and wherein a p-polarized transmittance of the emitted light exceeds a first threshold across of a range of +60 degrees to −60 degrees for the vertical field of view.

5. A curved cover for use with a light detection and ranging (LiDAR) system, comprising:
    a medium comprising a first curve and a second curve, wherein the first and second curves are designed to minimize deformation of exiting and receiving light beams and to prevent formation of ghost images, and wherein a focal length of the first and second curves is infinity.

6. The curved cover of claim 5, wherein the first and second curves satisfy the following equation:

$$R1*n*(n-1)-(n-1)*n*R2+d*(n-1)^2=0,$$

where R1 is the radius of the first curve, R2 is the radius of the second curve, n is a refractive index of medium, and d is a thickness of the medium.

7. The curved cover of claim 5, further comprising an angle of incidence that does not exceed a threshold.

8. A light detection and ranging (LiDAR) system mounted to a windshield of a vehicle, comprising:
    a laser system configured to emit light according to a beam field of view towards the windshield; and
    a windshield cover mounted to the windshield, wherein the windshield cover is configured to adjust the beam field of view to yield an exit beam field of view that compensates for Fresnel properties of the windshield, wherein a thickness of a cross-sectional area of the windshield cover varies as a function of position along the windshield.

9. The LiDAR system of claim 8, wherein the windshield cover is a prism.

10. The LiDAR system of claim 8, wherein a degree to which the emitted light is adjusted depends on the thickness of the cross-sectional area.

11. The LiDAR system of claim 8, wherein the windshield cover is flush mounted to the windshield.

12. The LiDAR system of claim 8, wherein the laser system is windshield agnostic.

13. The LiDAR system of claim 8, wherein the windshield cover is customized specifically to a make and model of the vehicle.

14. A vehicle system comprising:
    a windshield comprising an anti-reflective (AR) coating that covers a beam transmission portion of the windshield; and
    a laser system configured to emit light according to a beam field of view towards the beam transmission portion of the windshield, wherein the AR coating is configured to adjust the beam field of view to yield an exit beam field of view that compensates for Fresnel properties of the windshield,
    wherein the AR coating comprises an area having a first portion and a second portion, wherein the first portion comprises AR coating with first characteristics, and wherein the second portion comprises AR coating with second characteristics.

15. The vehicle system of claim 14, wherein the laser system is directly mounted to the beam transmission portion of the windshield.

16. The vehicle system of claim 14, wherein the AR coating comprises a variable thickness.

17. The vehicle system of claim 14, wherein the area has a size of the beam transmission portion, wherein the first portion of the area comprises a first refraction characteristic, and wherein the second portion comprises a second refraction characteristic, wherein the first and second refraction characteristics are different.

18. The LiDAR system of claim 14, wherein the AR coating comprises a flexible film having a first side and a second side, wherein the first side interfaces directly to the windshield and the second side is exposed to ambient air.

19. The LiDAR system of claim 18, wherein the first side comprises a refractive index that substantially matches a refractive index of the windshield, and wherein an index matching adhesive binds the first side to the windshield such that no air gap exists between the first side and the windshield.

20. The LiDAR system of claim 18, wherein the second side comprises an anti-reflective coating designed to complement an operating wavelength of the emitted light.

21. The LiDAR system of claim 8, wherein the windshield cover has a triangular cross-section that increases in thickness as the windshield cover extends from a top of the windshield to the bottom of the windshield.

* * * * *